(12) United States Patent
Hasegawa et al.

(10) Patent No.: US 11,276,983 B2
(45) Date of Patent: Mar. 15, 2022

(54) OPTICAL AMPLIFIER AND MULTI-CORE OPTICAL FIBER

(71) Applicant: SUMITOMO ELECTRIC INDUSTRIES, LTD., Osaka (JP)

(72) Inventors: Takemi Hasegawa, Osaka (JP); Hirotaka Sakuma, Osaka (JP); Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 695 days.

(21) Appl. No.: 16/157,151

(22) Filed: Oct. 11, 2018

(65) Prior Publication Data

US 2019/0115715 A1 Apr. 18, 2019

(30) Foreign Application Priority Data

Oct. 16, 2017 (JP) .............................. JP2017-200294

(51) Int. Cl.
  *H01S 3/067* (2006.01)
  *H01S 3/0941* (2006.01)
  *H01S 3/094* (2006.01)
  *G02B 6/02* (2006.01)
  *H01S 3/17* (2006.01)
  (Continued)

(52) U.S. Cl.
  CPC ...... *H01S 3/06737* (2013.01); *H01S 3/06708* (2013.01); *H01S 3/0941* (2013.01); *G02B 6/02042* (2013.01); *H01S 3/0064* (2013.01); *H01S 3/0078* (2013.01); *H01S 3/06716* (2013.01); *H01S 3/09415* (2013.01); *H01S 3/094003* (2013.01); *H01S 3/1608* (2013.01); *H01S 3/1693* (2013.01);
  (Continued)

(58) Field of Classification Search
  None
  See application file for complete search history.

(56) References Cited

U.S. PATENT DOCUMENTS 10,234,632 B1 * 3/2019 Keeler ................. G02B 6/4206
2011/0235983 A1 * 9/2011 Hayashi ............... G02B 6/4478
                                                            385/100
(Continued)

FOREIGN PATENT DOCUMENTS

CN    105308805 A    2/2016
JP    H09-321368 A   12/1997
(Continued)

OTHER PUBLICATIONS

Saitoh, "Multicore Fiber Technology", Journal of Lightwave Technology, vol. 34, No. 1, Jan. 1, 2016, pp. 55-66 (Year: 2016).*
(Continued)

*Primary Examiner* — Eric L Bolda
(74) *Attorney, Agent, or Firm* — Faegre Drinker Biddle & Reath LLP

(57) ABSTRACT

An optical amplifier is provided in which adjacent ones of a plurality of cores each containing a rare-earth element and included in an amplifying multi-core optical fiber (MCF) serve as coupled cores at an amplifying wavelength, a connecting MCF is connected to the amplifying MCF, a pump light source is connected to the connecting MCF, and the pump light source pumps the rare-earth element in the amplifying MCF through the connecting MCF.

8 Claims, 6 Drawing Sheets

(51) Int. Cl.
  *H01S 3/16* (2006.01)
  *H01S 3/00* (2006.01)
(52) U.S. Cl.
  CPC ............. *H01S 3/1695* (2013.01); *H01S 3/176* (2013.01); *H01S 2301/02* (2013.01)

(56) References Cited

U.S. PATENT DOCUMENTS

| | | | | |
|---|---|---|---|---|
| 2013/0114130 | A1* | 5/2013 | Stampoulidis | H01S 3/06737 359/341.32 |
| 2013/0301998 | A1 | 11/2013 | Hayashi | |
| 2013/0308913 | A1* | 11/2013 | Tanigawa | G02B 6/02042 385/126 |
| 2015/0168642 | A1* | 6/2015 | Mimura | G02B 6/02042 359/341.3 |
| 2019/0115715 | A1 | 4/2019 | Hasegawa et al. | |
| 2019/0207358 | A1 | 7/2019 | Hasegawa et al. | |

FOREIGN PATENT DOCUMENTS

| | | |
|---|---|---|
| JP | 2013-522914 A | 6/2013 |
| JP | 2015-510253 A | 4/2015 |
| JP | 2015-088530 A | 5/2015 |
| JP | 2017-021070 A | 1/2017 |
| JP | 2017-183564 A | 10/2017 |
| WO | WO-2011/116075 A1 | 9/2011 |
| WO | WO-2013/090549 A2 | 6/2013 |
| WO | WO 2018/047867 A1 | 3/2018 |

OTHER PUBLICATIONS

Abedin et al. "Cladding-pumped erbium-doped multicore fiber amplifier", Optics Express, Aug. 27, 2012 / vol. 20, No. 18 / p. 20191-20200. (Year: 2012).*
Tetsuya Hayashi, et al., "Coupled-Core Multi-Core Fibers: High-Spatial-Density Optical Transmission Fibers with Low Differential Modal Properties," Proc. ECOC 2015, We.1.4.1 (2015), 3 pages.
Masanori Koshiba, et al., "Multi-core fiber design and analysis: coupled-mode theory and coupled-power theory," Optics Express vol. 19, No. 26, pp. B102-B111 (2011).
U.S. Office Action dated Jun. 10, 2021 in U.S. Appl. No. 16/293,883.

* cited by examiner

OPTICAL AMPLIFIER AND MULTI-CORE OPTICAL FIBER

BACKGROUND OF THE INVENTION

Field of the Invention

The present invention relates to an optical amplifier and a multi-core optical fiber applied thereto.

Description of the Related Art

A multi-core optical fiber (hereinafter abbreviated to "MCF") including a plurality of cores in single cladding is a promising technology that increases spatial density, in terms of the amount of information to be transmitted, for efficient use of a limited sectional area of a transmission channel such as an underground conduit or a submarine cable. In particular, a coupled-core multi-core optical fiber (hereinafter abbreviated to "CC-MCF") including a plurality of cores among which guided modes are coupled to one another is highly effective in increasing the spatial density in terms of the amount of information to be transmitted, because the distance between adjacent one of the cores is short. To distinguish signals as a plurality of guided modes propagated through the coupled cores of the CC-MCF from one another, a technique of multi-input multi-output (MIMO) signal processing is required. The cost of MIMO signal processing increases with the difference in delay time between guided modes (i.e., differential mode delay, hereinafter abbreviated to "DMD").

There is a known technique of suppressing the increase in DMD in which the difference in group velocity between guided modes can be reduced by appropriately setting the coupling strength between cores. It is also known that DMD accumulation is randomized with mode coupling by bending or twisting an optical fiber in practical use, whereby the rate of accumulation of DMD can be reduced from a fiber length to the power of 1 to a fiber length to the power of ½. Such an MCF is called a coupled-mode coupled-core multi-core optical fiber (hereinafter abbreviated to "CM-CC-MCF") and is disclosed by Tetsuya Hayashi, et al., "Coupled-Core Multi-Core Fibers: High-Spatial-Density Optical Transmission Fibers with Low Differential Modal Properties," Proc. ECOC 2015, We.1.4.1 (2015).

Typically, the CM-CC-MCF has a coefficient of mode coupling between cores of 1 [1/m] or greater, or a coefficient of power coupling between cores of 10 [1/m] or greater. The coefficient of mode coupling refers to the ratio of a complex amplitude in a component of a certain guided mode that is coupled to another guided mode while being propagated by a unit length. More specifically, according to Masanori Koshiba et al., "Multi-core fiber design and analysis: coupled mode theory and coupled-power theory," Optics Express Vol. 19, No. 26, pp. B102-B111 (2011), the coefficient of mode coupling is defined as the coefficient of a mode-coupling equation. In this specification, for brief description, the minimum value of the coefficient of mode coupling between fundamental modes that is defined for each pair of adjacent cores is referred to as "inter-core mode-coupling coefficient."

The coefficient of power coupling refers to the ratio of the power in a component of a certain guided mode that is coupled to another guide mode while being propagated by a unit length. More specifically, according to Masanori Koshiba et al., "Multi-core fiber design and analysis: coupled mode theory and coupled-power theory," Optics Express Vol. 19, No. 26, pp. B102-B111 (2011), the coefficient of power coupling is defined as the coefficient of a power-coupling equation. In this specification, for brief description, the minimum value of the coefficient of power coupling between fundamental modes that is defined for each pair of adjacent cores is referred to as "inter-core power-coupling coefficient." As the mode-coupling coefficient or the power-coupling coefficient becomes greater, the effect of reducing the rate of DMD accumulation with respect to the length of propagation becomes greater. Whether or not any significant mode coupling has occurred during the propagation by a predetermined length can be evaluated on the basis of crosstalk.

Crosstalk refers to the ratio of a portion of optical power that is inputted to a certain core but is outputted from another core with respect to the optical power that is originally inputted to the former core. In this specification, for brief description, the maximum value of crosstalk that is defined for each pair of adjacent cores is referred to as "inter-core crosstalk." In general, if the inter-core crosstalk is −20 dB or smaller, the mode coupling is considered less significant. If the inter-core crosstalk is −20 dB or greater or, more preferably, −17 dB or greater, it is considered that a significant mode coupling is occurring.

To transmit an optical signal over a long distance, an optical amplifier is necessary. It is known that the use of a rare-earth-added-core optical fiber in which a rare-earth element, particularly erbium, is added to cores that propagate an optical signal to be amplified is efficient as a medium of optical amplification for the optical amplifier. However, to allow a rare-earth element to exhibit an optical amplification characteristic, pump light is necessary. It is important for the MCF to efficiently couple the pump light to a plurality of rare-earth-added cores.

In an amplifying MCF disclosed by International Publication No. WO2011-116075, a pump core through which pump light is propagated is provided on a center axis of an amplifying MCF, and a plurality of cores (hereinafter referred to as "amplifier cores") to each of which a rare-earth element is added are provided around the pump core. The amplifying MCF amplifies signal light by coupling signal light emitted from each of a plurality of cores of an MCF transmission channel to a corresponding one of the plurality of amplifier cores.

SUMMARY OF THE INVENTION

It is an object of the present invention to provide an optical amplifier that is applicable to optical amplification in a system employing coupled-core multi-core optical fibers (CC-MCFs) through which light is propagated while causing power coupling among a plurality of cores, the optical amplifier being configured to exhibit high uniformity in gain among the cores and to realize efficient use of pump light; and to also provide an MCF that is applicable to an amplifying MCF included in the optical amplifier.

To solve the above problem, provided is an optical amplifier including an amplifying multi-core optical fiber, a connecting multi-core optical fiber, and a pump light source. The amplifying multi-core optical fiber includes a plurality of first cores each extending along a first center axis and made of silica glass with a rare-earth element added to the silica glass, and first cladding surrounding the individual first cores and made of silica glass having a lower refractive index than all of the first cores. The amplifying multi-core optical fiber has an absorption coefficient of 1 [dB/m] or greater at a pump wavelength at which the rare-earth element is pumped, and an inter-core crosstalk of −17 [dB] or greater at an amplifying wavelength at which the rare-earth element amplifies light. The connecting multi-core optical fiber includes a plurality of second cores each extending along a second center axis and optically connected to a corresponding one of the plurality of first cores, the second cores being made of silica glass; and second cladding surrounding the individual second cores and made of silica glass having a lower refractive index than all of the second cores. The pump light source supplies pump light at the pump wavelength to the rare-earth element in the plurality of first cores through the connecting multi-core optical fiber.

In the optical amplifier according to the present invention, the connecting multi-core optical fiber may have an inter-core crosstalk of −17 [dB] or greater at the pump wavelength. Furthermore, the pump light supplied from the pump light source may pump the rare-earth element after the pump light is coupled to at least one of the plurality of second cores, is further coupled to remaining ones of the plurality of second cores, and is further coupled from each of the plurality of second cores to a corresponding one of the plurality of first cores that is optically connected to that second core.

In the optical amplifier according to the present invention, in a section of the amplifying multi-core optical fiber that is taken orthogonally to the first center axis, one of the plurality of first cores may be positioned on the first center axis. Furthermore, in a section of the connecting multi-core optical fiber that is taken orthogonally to the second center axis, one of the plurality of second cores may be positioned on the second center axis. Furthermore, the pump light source may include a single-core single-mode optical fiber including a third core extending along a third center axis, and third cladding surrounding the third core. Furthermore, the single-core single-mode optical fiber and the connecting multi-core optical fiber may be arranged such that the third core and the second core that is positioned on the second center axis are optically connected to each other.

Alternatively, in the optical amplifier according to the present invention, the amplifying multi-core optical fiber may further include a first resin layer surrounding the first cladding and having a lower refractive index than the first cladding. Furthermore, the connecting multi-core optical fiber may further include a second resin layer surrounding the second cladding and having a lower refractive index than the second cladding, the second cladding being optically connected to the first cladding. Furthermore, the pump light that is supplied from the pump light source may be coupled to the second cladding, be further coupled from the second cladding to the first cladding, and pump the rare-earth element in the plurality of first cores surrounded by the first cladding.

In the optical amplifier according to the present invention, the rare-earth element may include, for example, erbium. Furthermore, the pump wavelength may be, for example, 980 nm, and the amplifying wavelength may be, for example, 1550 nm.

Another aspect of the present invention provides a multi-core optical fiber including a plurality of cores each extending along a predetermined center axis and made of silica glass with a rare-earth element added to the silica glass, cladding surrounding the individual cores and made of silica glass having a lower refractive index than all of the plurality of cores, and a resin coating surrounding an outer peripheral surface of the cladding. In the multi-core optical fiber, an inter-core crosstalk as an index representing a state of coupling between adjacent ones of the plurality of cores is −17 [dB] or greater at a wavelength of 1550 nm.

In the multi-core optical fiber according to the above aspect of the present invention, the plurality of cores may include one core extending spirally around and along the center axis.

According to each of the above aspects of the present invention, variation in gain among the cores is suppressed to be small by utilizing the coupling between the cores of the amplifying multi-core optical fiber (MCF). Furthermore, since a coupled-core multi-core optical fiber (CC-MCF) including cores (amplifying cores) to which rare earth is added is employed as the amplifying optical fiber, the pump light and the rare-earth element overlap each other by a large area. Consequently, the efficiency of utilization of pump light can be increased.

DESCRIPTION OF THE PREFERRED EMBODIMENTS

Figure 1:
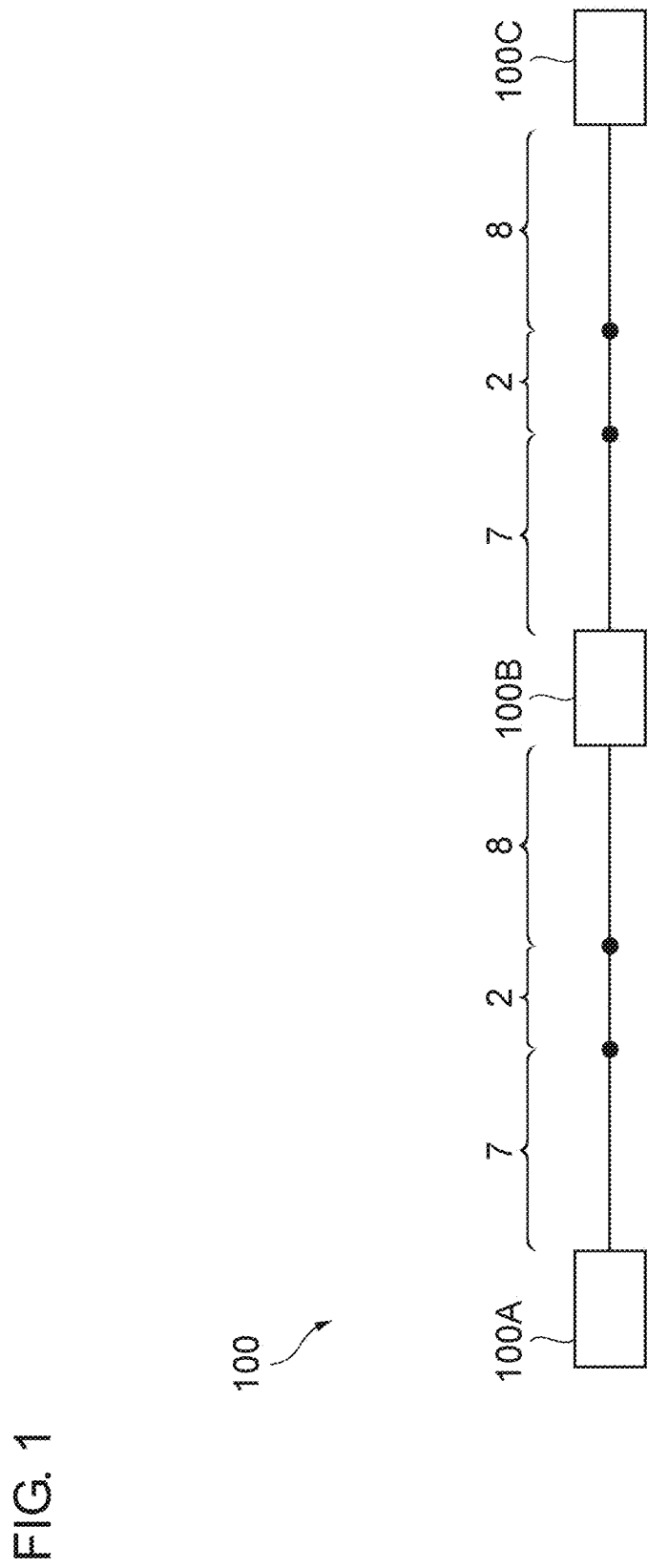
FIG. 1 is a schematic diagram of an optical transmission system to which an optical amplifier according to the present invention is applicable.

The present inventors have examined known amplifying MCFs and have identified the following problems. When an optical signal that is propagated through a transmission channel formed of a coupled-mode coupled-core multi-core optical fiber (CM-CC-MCF) is amplified by the use of a known amplifying MCF, gain tends to vary significantly among cores. Consequently, the advantageous effect of multi-input multi-output (MIMO) signal processing, which is based on an assumption that the power is uniform among modes, may be reduced. Moreover, the efficiency of utilization of pump light is low, and it is difficult to couple the pump light to each of the cores of the CM-CC-MCF. The amplifying MCF disclosed by International Publication No. WO2011-116075 is intended for an optical signal that is propagated through a transmission channel formed of a known uncoupled MCF. Therefore, the inter-core crosstalk in the amplifying MCF is suppressed to be small, and the variation in the characteristics of the cores that is attributed to manufacturing error relatively directly affects the variation in gain.

In the amplifying MCF disclosed by International Publication No. WO2011-116075, only a portion of the pump light coupled to the pump core is coupled to the amplifier cores and contributes to the amplification. The remaining portion of the pump light does not contribute to the amplification. That is, the efficiency of utilization of pump light is low. In general, unless the pump core in which pump light travels locally and the amplifier cores to which a rare-earth element is added spatially coincide with each other, the efficiency of utilization of pump light is low. This is because the area of overlap between the pump light and the rare-earth element is small, and a large portion of the power of the pump light is therefore dissipated without being absorbed by the rare-earth element. Considering the efficiency of utilization of pump light, it is beneficial to couple the pump light to each of the plurality of amplifier cores. In the known art, however, to couple the pump light to each of the plurality of amplifier cores, the optical system requires an increased number of components, leading to a high cost and low reliability.

Specific embodiments of the optical amplifier and the multi-core optical fiber (MCF) according to the present invention will now be described in detail with reference to the accompanying drawings. The present invention is not limited to the following embodiments. The scope of the present invention is defined by the appended claims and is intended to encompass all equivalents thereof and all modifications thereof made within the scope. In the following description given with reference to the drawings, same reference numerals denote like elements, and redundant description is omitted.

FIG. 1 is a schematic diagram of an optical transmission system 100 to which an optical amplifier 2 according to an embodiment of the present invention is applicable. The optical transmission system 100 includes a plurality of repeater stations 100A to 100C, and transmission channels provided between the repeater station 100A and the repeater station 100B and between the repeater station 100B and the repeater station 100C, respectively. The transmission channels provided between the repeater stations are each a CM-CC-MCF (a transmission MCF) and each include the optical amplifier 2. In the CM-CC-MCF forming the transmission channel, mode coupling occurs. However, since a signal transmitted to the repeater station undergoes MIMO signal processing, the signal is restored correctly, despite the occurrence of mode coupling. Nevertheless, to obtain the above advantageous effect of MIMO signal processing, the difference in insertion loss between cores of the CM-CC-MCF needs to be negligibly small.

Specifically, the transmission channel provided between the repeater station 100A and the repeater station 100B includes the optical amplifier 2, a first transmission MCF (an input-side CM-CC-MCF) 7 provided between the repeater station 100A and the optical amplifier 2, and a second transmission MCF (an output-side CM-CC-MCF) 8 provided between the optical amplifier 2 and the repeater station 100B. In the optical transmission system 100, the transmission channel provided between the repeater station 100B and the repeater station 100C has the same configuration as the transmission channel provided between the repeater station 100A and the repeater station 100B. In the optical transmission system 100, the transmission channels between the repeater stations each include only one line. Alternatively, for higher reliability, each transmission channel may include two or more lines.

Figure 2:
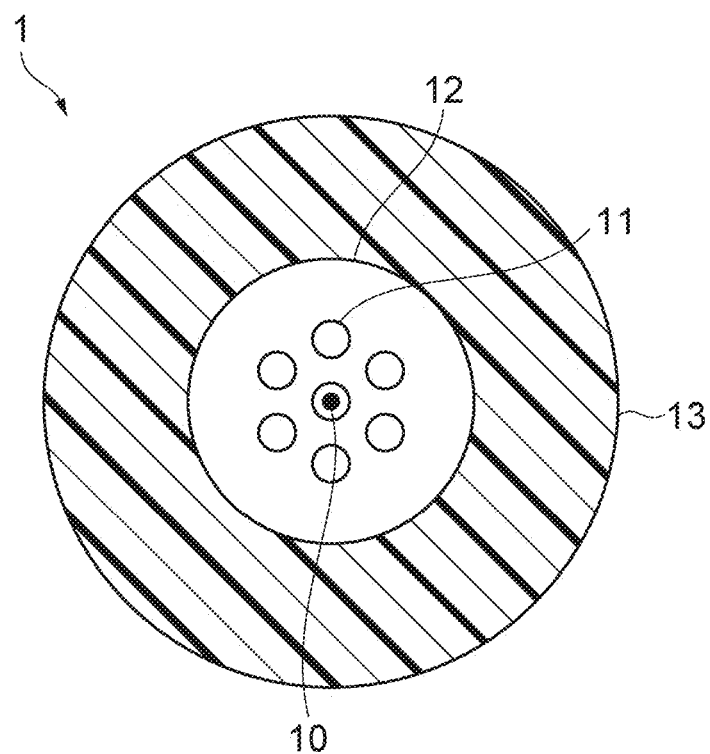
FIG. 2 is a sectional view of a multi-core optical fiber according to an embodiment of the present invention, taken along a plane that is orthogonal to a center axis thereof.

FIG. 2 is a sectional view of an amplifying MCF 1 (an MCF according to the embodiment of the present invention) applicable to the optical amplifier 2, taken along a plane that is orthogonal to a center axis 10 thereof. The amplifying MCF 1 includes seven cores 11 one of which is positioned on the center axis 10 and the others are provided around the center axis 10 substantially symmetrically. The amplifying MCF 1 further includes cladding 12 surrounding the individual cores 11, and a coating (resin coating) 13 provided over the outer peripheral surface of the cladding 12.

The cladding 12 and the coating 13 are substantially coaxial with each other. The cores 11 and the cladding 12 each contain silica glass as a base material. The cores 11 each also contain erbium (Er), a rare-earth element, as a dopant for optical amplification. It is preferable that the core 11 further contain an element such as germanium (Ge) or aluminum (Al) as a dopant for optimizing the amplification characteristic and the refractive index thereof. It is also preferable that the cladding 12 further contain fluorine as a dopant. In such a case, the refractive-index difference between each core 11 and the cladding 12 increases, and the optical loss occurring when the amplifying MCF 1 is bent with a small radius of curvature can be reduced. Therefore, the size of the optical amplifier can be reduced. The cores 11 each have a higher refractive index than the cladding 12 by 0.3% to 1.5% in relative refractive-index difference. Hence, light is confined in the cores 11.

The coating 13 is made of ultraviolet-curable resin. More preferably, the coating 13 has a lower refractive index than the cladding 12 by 1% to 5% in relative refractive-index difference. In such a case, the rare-earth element of the core 11 can be pumped with the pump light that is propagated through the cladding 12, and the output power of the amplifier can therefore be increased. Furthermore, although not illustrated, the coating 13 may include a plurality of layers (resin layers). If the coating 13 includes a plurality of resin layers, it is preferable that the innermost one of the layers that adjoins the cladding 12 have a lower Young's modulus than outer ones of the layers including the outer peripheral surface of the coating 13. With the configuration, a component of a random external force applied to the outer peripheral surface of the amplifying MCF 1 and acting on the glass to cause microbends is attenuated.

The amplifying MCF 1 propagates pump light having a wavelength of 980 nm or 1480 nm for pumping Er and propagates signal light having a wavelength of 1530 nm to 1610 nm, which is typical in optical transmission, thereby amplifying the signal light. The cores 11 each preferably have a diameter of 2 μm to 16 μm, or more preferably 3 μm to 8 μm. In such a case, the fundamental mode defined for each of the cores 11 is confined within that core 11 at an appropriate intensity (propagation of the fundamental mode within each core 11 is guaranteed), and higher modes are attenuated by bending the amplifying MCF 1 (propagation of higher modes is suppressed). Hence, the increase in noise of higher modes can be suppressed. The cladding 12 has a diameter of 124 μm to 126 μm and is therefore manufacturable by using a known amplifier assembly line at a low cost. The coating 13 has an outside diameter of 240 μm to 260 μm. Therefore, the loss attributed to intermittent slight bending (microbends) that tends to occur when the amplifying MCF 1 is in practical use can be reduced to a low level. In this specification, an optical characteristic attributed to a single core, assuming that there are no other cores, is referred to as an optical characteristic defined by the individual core.

In the amplifying MCF 1, it is preferable that the interval between the centers of adjacent ones of the cores 11 be 1.1 times the diameter of the cores 11 and 30 μm or smaller, and that the inter-core crosstalk at a wavelength of 1550 nm be −17 [dB] or greater. Furthermore, as with the CM-CC-MCF forming the transmission channel, it is preferable that the amplifying MCF 1 have an inter-core mode-coupling coefficient of 1 [1/m] or greater, or an inter-core power-coupling coefficient of 10 [1/m] or greater.

Figure 3:
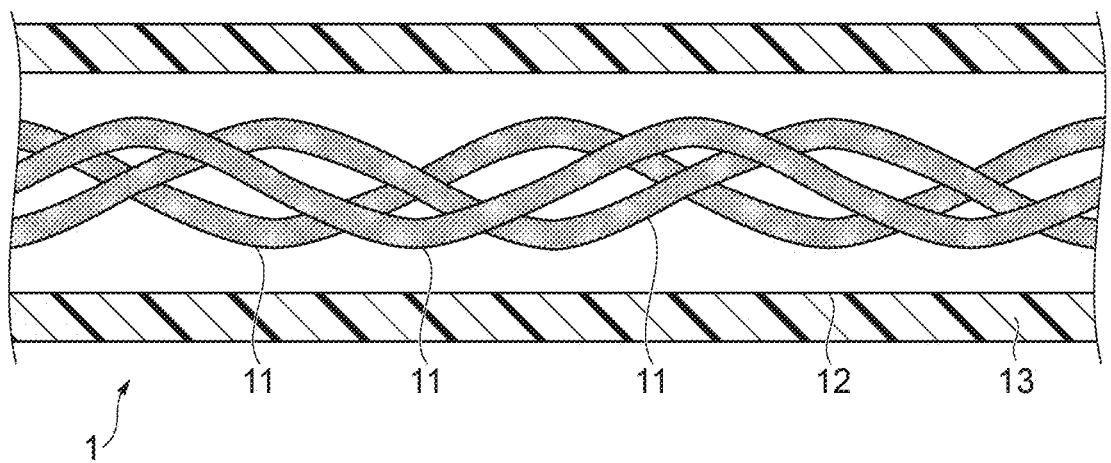
FIG. 3 is a sectional view of the multi-core optical fiber illustrated in FIG. 2, taken along a plane in which the center axis thereof extends.

FIG. 3 is a sectional view of the amplifying MCF 1, taken along a plane in which the center axis 10 thereof extends. Preferably, the cores 11 of the amplifying MCF 1 each extend spirally around and along a fiber axis (the center axis 10) with a period of spiral of 0.5 [m] or smaller, whereby mode coupling is caused. Thus, the difference in insertion loss between the cores 11 of the amplifying MCF 1 can be reduced. Accordingly, the reduction in the advantageous effect of MIMO signal processing that may be caused by the difference in insertion loss between the cores can be prevented. Furthermore, the requirement regarding the manufacturing tolerance of the amplifying MCF 1 is eased. Consequently, the manufacturing cost is reduced. In an amplifier, gain and loss both occur. Gain can be regarded as negative loss. Therefore, gain and loss are generally referred to as insertion loss.

Figure 4:
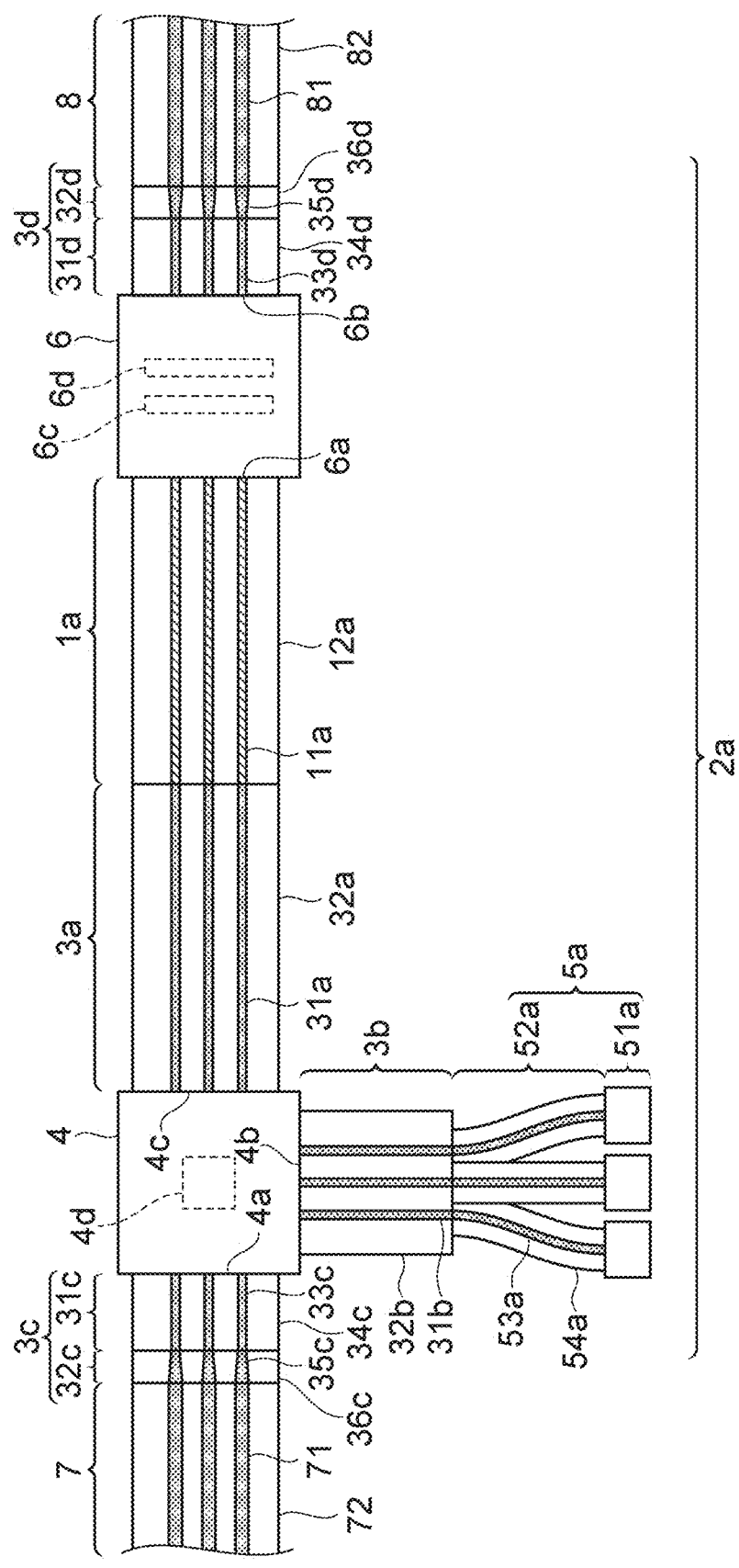
FIG. 4 is a schematic diagram of an optical amplifier according to a first embodiment.

FIG. 4 is a schematic diagram of an optical amplifier 2a according to a first embodiment. In the optical transmission system 100, the optical amplifier 2a forms part of each transmission channel extending between adjacent ones of the repeater stations. FIG. 4 illustrates only an optical configuration of the optical amplifier 2a, and the coatings of the respective optical fibers are not illustrated. However, it is desirable that each of the optical fibers be appropriately coated so that the mechanical strength and the ease of removal of cladding modes are improved. The optical amplifier 2a is provided between the first transmission MCF 7 and the second transmission MCF 8 and includes a multiplexer/demultiplexer 4, a pump light source 5a, first and second connecting MCFs 3a and 3b, an amplifying MCF 1a, and an optical filter 6.

The amplifying MCF 1a includes a plurality of cores (first cores) 11a and cladding (first cladding) 12a surrounding the individual cores 11a, and is provided between the multiplexer/demultiplexer 4 and the optical filter 6. The amplifying MCF 1a has substantially the same core arrangement (in terms of the number and interval of cores) as the amplifying MCF 1 and propagates signal light at a wavelength of 1550 nm while coupling the modes thereof. The connecting MCF includes the first connecting MCF 3a provided between the multiplexer/demultiplexer 4 and the amplifying MCF 1a, and the second connecting MCF 3b provided between the multiplexer/demultiplexer 4 and the pump light source 5a. A first mode-field-diameter (MFD) conversion MCF 3c is provided between the multiplexer/demultiplexer 4 and the first transmission MCF 7. A second MFD conversion MCF 3d is provided between the optical filter 6 and the second transmission MCF 8. The pump light source 5a includes a light-emitting part 51a, and a pump-light-output-fiber bundle 52a provided between the light-emitting part 51a and the second connecting MCF 3b. The pump-light-output-fiber bundle 52a is a bundle of single-mode fibers (SMFs) each including a single core.

The output end face of the first connecting MCF 3a is connected to the input end face of the amplifying MCF 1a. The first connecting MCF 3a has substantially the same core arrangement (in terms of the number and interval of cores) as the amplifying MCF 1 and includes a plurality of cores (second cores) 31a and cladding (second cladding) 32a surrounding the individual cores 31a. The first connecting MCF 3a is basically made of silica glass, as with the amplifying MCF 1, but contains no rare-earth element such as Er as an additive, unlike the amplifying MCF 1. If the first connecting MCF 3a includes cores made of pure silica glass and cladding containing fluorine as an additive, the border between each of the cores and the cladding becomes clear. Such a configuration is preferable because the alignment between the first connecting MCF 3a and the amplifying MCF 1a becomes easy.

As another preferable configuration, the first connecting MCF 3a may include a plurality of cores containing Ge as an additive at the same concentration as in the amplifying MCF 1a, and cladding made of silica glass with fluorine as an additive at the same concentration as in the amplifying MCF 1a or pure silica glass. An optical fiber having such a configuration can be fusion-spliced with the amplifying MCF 1a with small loss. Furthermore, it is preferable that the first connecting MCF 3a and the amplifying MCF 1a have substantially the same core diameter. In such a case, the first connecting MCF 3a can be fusion-spliced with the amplifying MCF 1a with much smaller loss.

The input end face of the first connecting MCF 3a is connected to an output port 4c of the multiplexer/demultiplexer 4. The multiplexer/demultiplexer 4 includes a multiplexer/demultiplexer device 4d, a signal-light input port 4a to which the output end face of the first MFD conversion MCF 3c is connected, a pump-light input port 4b to which the output end face of the second connecting MCF 3b is connected, and the output port 4c to which the input end face of the first connecting MCF 3a is connected. Signal light coupled to the signal-light input port 4a through the first MFD conversion MCF 3c and pump light coupled to the pump-light input port 4b through the second connecting MCF 3b are multiplexed by the multiplexer/demultiplexer device 4d, and the multiplexed light is outputted from the output port 4c. The multiplexer/demultiplexer device 4d is an optical system including optical elements such as a dielectric multi-layer filter and a lens. It is preferable that the first connecting MCF 3a, the second connecting MCF 3b, and the first MFD conversion MCF 3c have substantially the same mode field diameter. Thus, the insertion loss of the multiplexer/demultiplexer 4 can be reduced.

The first transmission MCF 7 has substantially the same core arrangement (in terms of the number and interval of cores) as the amplifying MCF 1. The first transmission MCF 7 includes a plurality of cores 71 and cladding 72 surrounding the individual cores 71. The plurality of cores 71 included in the first transmission MCF 7 and among which modes are coupled are made of silica glass, with no rare-earth element added thereto. That is, the plurality of cores 71 are made of pure silica glass. On the other hand, the cladding 72 contains fluorine as an additive. Alternatively, the plurality of cores 71 may contain Ge as an additive, and the cladding 72 may be made of pure silica glass. As described by Tetsuya Hayashi, et al., "Coupled-Core Multi-Core Fibers: High-Spatial-Density Optical Transmission Fibers with Low Differential Modal Properties," Proc. ECOC 2015, We.1.4.1 (2015), the first transmission MCF 7 causes mode coupling most effectively for optical-transmission signal light at a wavelength of 1530 nm to 1610 nm and is designed to propagate the signal light with a small differential mode delay (DMD).

The first MFD conversion MCF 3c includes a steady section 31c. The steady section 31c is connected to the multiplexer/demultiplexer 4. It is desirable that the first MFD conversion MCF 3c further include a transition section 32c provided between the first transmission MCF 7 and the steady section 31c. The transition section 32c has a core diameter that continuously changes, whereby the core diameter is made to change continuously from the first transmission MCF 7 to the steady section 31c. Thus, even if the first transmission MCF 7 and the first MFD conversion MCF 3c have different mode-field diameters, the optical loss attributed to mode nonconformity can be reduced. The steady section 31c includes a plurality of cores 33c and cladding 34c surrounding the individual cores 33c. The transition section 32c includes a plurality of cores 35c and cladding 36c surrounding the individual cores 35c. The cores have different diameters between the two sections 31c and 32c but are arranged as illustrated in FIG. 2 both in the two sections 31c and 32c. In particular, in the steady section 31c, the first MFD conversion MCF 3c has substantially the same configuration as the first connecting MCF 3a. Therefore, the optical loss in the multiplexer/demultiplexer 4 is reduced, and the noise generation in the optical amplifier 2a as a whole is reduced.

The transition section 32c provided between the first transmission MCF 7 and the steady section 31c of the first MFD conversion MCF 3c is obtained by, for example, heating an end of the steady section 31c with arc discharge or with flame. The cores 35c and the cladding 36c are obtained by diffusing Ge or fluorine added to the cores 33c and the cladding 34c. In this process, it is desirable that the amount of heat be limited to a specific level or below, so that the outside diameter of the cladding 36c is made constant. Thus, the reduction in the mechanical strength can be avoided.

The second connecting MCF 3b has substantially the same configuration as the first connecting MCF 3a. Therefore, the optical loss of pump light in the multiplexer/demultiplexer 4 is reduced, and the efficiency of power utilization of the optical amplifier 2a as a whole can be increased. That is, the second connecting MCF 3b has substantially the same core arrangement (in terms of the number and interval of cores) as the amplifying MCF 1 and includes a plurality of cores (second cores) 31b and cladding (second cladding) 32b surrounding the individual cores 31b.

The pump light source 5a is connected to the other end face of the second connecting MCF 3b. The pump light source 5a includes the light-emitting part 51a as a group of semiconductor laser diodes that emit pump light, and the pump-light-output-fiber bundle 52a that transmits the pump light. The pump-light-output-fiber bundle 52a is a bundle of typical SMFs each including a core 53a (a single core) and cladding 54a.

In the first embodiment, the amplifying MCF 1a and the first connecting MCF 3a are configured as illustrated in FIG. 3 with the cores extending spirally, and propagate signal light while coupling the modes thereof. At a wavelength of 1550 nm, which is a wavelength intended for optical transmission, the amplifying MCF 1a and the first connecting MCF 3a each have an inter-core crosstalk of −17 [dB] or greater. As with the CM-CC-MCF forming the transmission channel, it is preferable that the amplifying MCF 1a and the first connecting MCF 3a each have an inter-core mode-coupling coefficient of 1[1/m] or greater, or an inter-core power-coupling coefficient of 10[1/m] or greater. Thus, modes of the signal light propagated through the cores of the optical amplifier 2a are coupled. Such mode coupling evens out the values of insertion loss that are different between the cores of the optical amplifier 2a, and the difference in insertion loss is thus reduced. Crosstalk appears to be noise in a signal that is being propagated. The influence of such crosstalk can be removed by MIMO signal processing or the like performed after coherent detection of the signal. However, to make the MIMO signal processing effective, variation in gain among the cores needs to be small.

It is preferable that at least one of the first connecting MCF 3a and the second connecting MCF 3b have an inter-core crosstalk of −17 [dB] or greater at the pump wavelength. In such a case, in the connecting MCFs 3a and 3b including the respective second cores 31a and 31b that are each optically connected to a corresponding one of the plurality of first cores 11a of the amplifying MCF 1a, before the pump light is supplied to the plurality of cores 11a of the amplifying MCF 1a, the pump light is coupled in advance to at least one (a specific core) of the second cores and is further coupled to the remaining ones of the second cores. Thus, coupling of the pump light from the plurality of second cores 31a and 31b of the connecting MCFs 3a and 3b to the plurality of cores 11a of the amplifying MCF 1a (between two groups of cores that are optically connected to each other) is realized. Consequently, the size and the power consumption of the optical amplifier 2a that amplifies signal light to be transmitted through the transmission channels each being formed of a coupled-core MCF (a transmission MCF) can be effectively reduced.

Difference in insertion loss between cores of an optical amplifier may reduce the advantageous effect of MIMO signal processing performed in the optical transmission system 100. However, in the optical amplifier 2a according to the first embodiment, since the difference in insertion loss between cores is low, the advantageous effect of MIMO signal processing can be produced satisfactorily. In the prior-art amplifying MCF including a pump core that is disclosed by International Publication No. WO2011-116075, the inter-core crosstalk is as small as −20 dB or below. Therefore, to reduce the difference in insertion loss between cores, the manufacturing error of the amplifying MCF needs to be reduced, which leads to a problem that the optical amplifier costs high. In contrast, the optical amplifier 2a according to the first embodiment is free of such a problem.

In the optical amplifier 2a, the output end face of the amplifying MCF 1a is connected to an input port 6a of the optical filter 6. The optical filter 6 includes the input port 6a connected to the output end face of the amplifying MCF 1a, and an output port 6b connected to the input end face of the second MFD conversion MCF 3d. The optical filter 6 further includes thereinside an optical isolator 6c, a band-pass filter 6d, and other optical elements (not illustrated) such as lens. The optical isolator 6c blocks noise light, such as Rayleigh scattered light and Fresnel reflection light, propagated reversely from the second MFD conversion MCF 3d toward the amplifying MCF 1a, thereby reducing the noise occurring in the optical amplifier 2a. The band-pass filter 6d blocks amplified spontaneous emission light (ASE light) and residual pump light inputted from the amplifying MCF 1a, thereby reducing the noise occurring in the optical amplifier 2a. It is preferable that the amplifying MCF 1a and the second MFD conversion MCF 3d have substantially the same mode-field diameter. Thus, the insertion loss of the optical filter 6 can be reduced.

The second MFD conversion MCF 3d is connected to the second transmission MCF 8. The second MFD conversion MCF 3d and the second transmission MCF 8 have substantially the same core arrangement (in terms of the number and interval of cores) as the amplifying MCF 1a. As with the first MFD conversion MCF 3c, the second MFD conversion MCF 3d includes a steady section 31d. The steady section 31d is connected to the output port 6b of the optical filter 6. It is desirable that the second MFD conversion MCF 3d further include a transition section 32d provided between the second transmission MCF 8 and the steady section 31d. The transition section 32d has a core diameter that continuously changes, whereby the core diameter is made to change continuously from the second transmission MCF 8 to the steady section 31d. Thus, the optical loss attributed to mode nonconformity can be reduced.

The steady section 31d includes a plurality of cores 33d and cladding 34d surrounding the individual cores 33d. The transition section 32d includes a plurality of cores 35d and cladding 36d surrounding the individual cores 35d. The second transmission MCF 8 includes a plurality of cores 81 among which modes are coupled, and cladding 82 surrounding the individual cores 81. The second transmission MCF 8 propagates signal light (output light) amplified by the optical amplifier 2a to a receiver or another optical amplifier provided next thereto. The second transmission MCF 8 has substantially the same configuration as the first transmission MCF 7.

Figure 5:
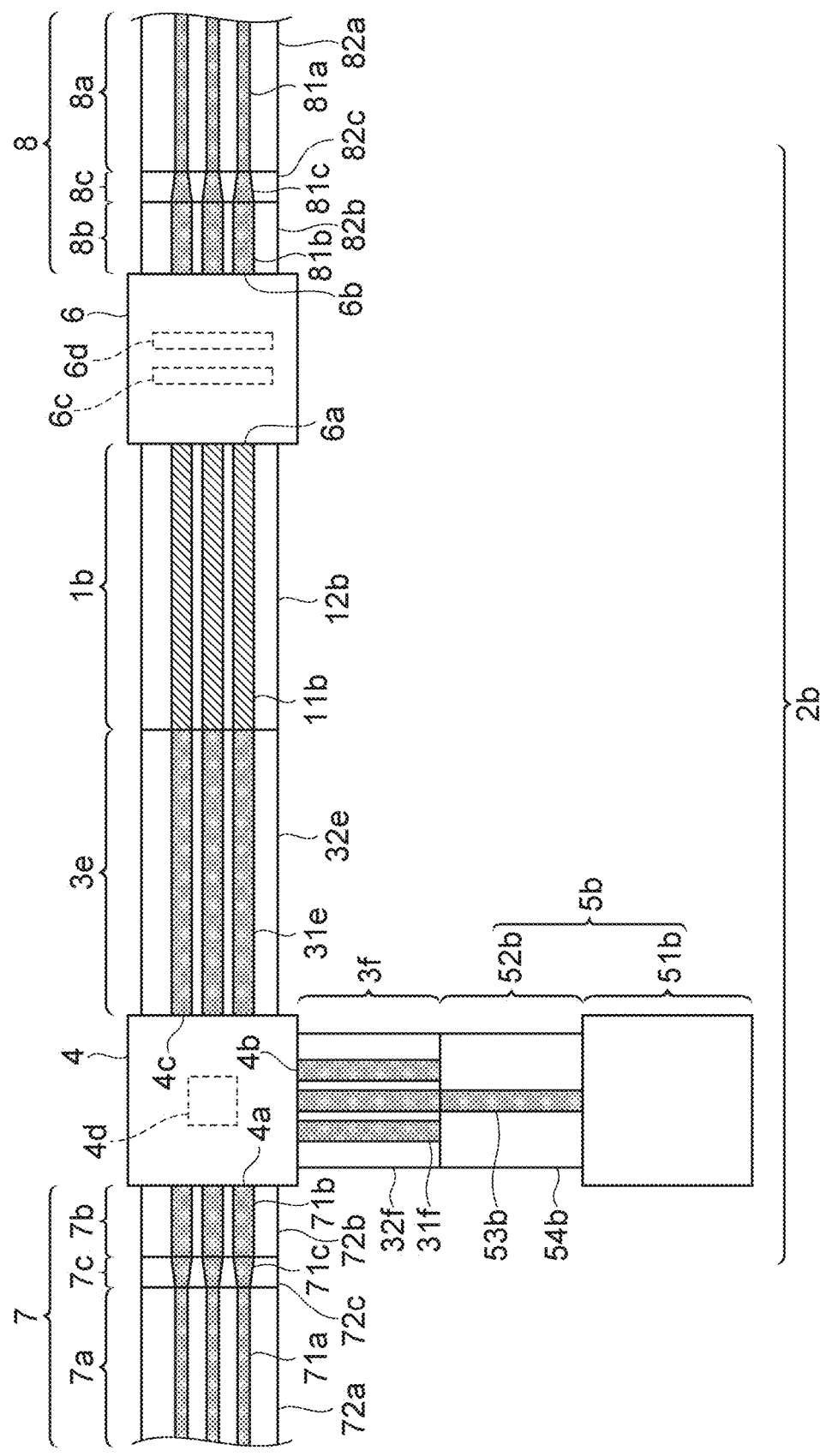
FIG. 5 is a schematic diagram of an optical amplifier according to a second embodiment.

FIG. 5 is a schematic diagram of an optical amplifier 2b according to a second embodiment. Description of features that are the same as those of the first embodiment is omitted accordingly. The optical amplifier 2b is provided between the first transmission MCF 7 and the second transmission MCF 8 and includes the multiplexer/demultiplexer 4, a pump light source 5b, first and second connecting MCFs 3e and 3f, an amplifying MCF 1b, and the optical filter 6.

The amplifying MCF 1b includes a plurality of cores (first cores) 11b and cladding (first cladding) 12b surrounding the individual cores 11b. The amplifying MCF 1b is provided between the multiplexer/demultiplexer 4 and the optical filter 6. The amplifying MCF 1b has substantially the same core arrangement (in terms of the number and interval of cores) as the amplifying MCF 1 and propagates signal light at a wavelength of 1550 nm while coupling the modes thereof. The connecting MCF includes the first connecting MCF 3e provided between the multiplexer/demultiplexer 4 and the amplifying MCF 1b, and the second connecting MCF 3f provided between the multiplexer/demultiplexer 4 and the pump light source 5b. The pump light source 5b includes a light-emitting part 51b, and a single-core pump light output fiber 52b provided between the light-emitting part 51b and the second connecting MCF 3f.

The output end face of the first connecting MCF 3e is connected to the input end face of the amplifying MCF 1b. The first connecting MCF 3e has substantially the same core arrangement (in terms of the number and interval of cores) as the amplifying MCF 1 and includes a plurality of cores (second cores) 31e and cladding (second cladding) 32e surrounding the individual cores 31a. The first connecting MCF 3e propagates signal light at a wavelength of 1550 nm and pump light at a wavelength of 980 nm or 1480 nm while coupling the modes thereof. The first connecting MCF 3e is basically made of silica glass, as with the amplifying MCF 1, but contains no rare-earth element such as Er as an additive, unlike the amplifying MCF 1. If the first connecting MCF 3e includes cores made of pure silica glass and cladding containing fluorine as an additive, the border between each of the cores and the cladding becomes clear. Such a configuration is preferable because the alignment between the first connecting MCF 3e and the amplifying MCF 1b becomes easy.

As another preferable configuration, the first connecting MCF 3e may include a plurality of cores containing Ge as an additive at the same concentration as in the amplifying MCF 1b, and cladding made of silica glass with fluorine as an additive at the same concentration as in the amplifying MCF 1b or pure silica glass. An optical fiber having such a configuration can be fusion-spliced with the amplifying MCF 1b with small loss. Furthermore, it is preferable that the first connecting MCF 3e and the amplifying MCF 1b have substantially the same core diameter. In such a case, the first connecting MCF 3e can be fusion-spliced with the amplifying MCF 1b with much smaller loss.

The input end face of the first connecting MCF 3e is connected to the output port 4c of the multiplexer/demultiplexer 4. The multiplexer/demultiplexer 4 includes the multiplexer/demultiplexer device 4d, the signal-light input port 4a to which the output end face of the first transmission MCF 7 is connected, the pump-light input port 4b to which the output end face of the second connecting MCF 3f is connected, and the output port 4c to which the input end face of the first connecting MCF 3e is connected. In the optical amplifier 2b, an end portion, including the output end face, of the first transmission MCF 7 includes a steady section 7a, an increased-core-diameter section 7b, and a transition section 7c. The steady section 7a has the same configuration (core diameter) as the first transmission MCF 7 illustrated in FIG. 4 and includes a plurality of cores 71a and cladding 72a surrounding the individual cores 71a. The increased-core-diameter section 7b includes the output end face of the first transmission MCF 7, and a plurality of cores 71b each having an increased diameter. The transition section 7c is provided between the steady section 7a and the increased-core-diameter section 7b and includes a plurality of cores 71c each having a diameter increasing from the steady section 7a to the increased-core-diameter section 7b.

Signal light coupled to the signal-light input port 4a through the increased-core-diameter section 7b and pump light coupled to the pump-light input port 4b through the second connecting MCF 3f are multiplexed by the multiplexer/demultiplexer device 4d, and the multiplexed light is outputted from the output port 4c. The multiplexer/demultiplexer device 4d is an optical system including optical elements such as a dielectric multi-layer filter and a lens. It is preferable that the first and second connecting MCFs 3e and 3f and the increased-core-diameter section 7b have substantially the same mode field diameter. Thus, the insertion loss of the multiplexer/demultiplexer 4 can be reduced.

The first transmission MCF 7 includes the increased-core-diameter section 7b at the end thereof connected to the multiplexer/demultiplexer 4. Such a configuration reduces the coupling loss attributed to the axial misalignment with respect to the multiplexer/demultiplexer 4. On the other hand, in the steady section 7a of the first transmission MCF 7 that is not at the end of the first transmission MCF 7, if the core diameter is too large, the difference in propagation constant between modes to be propagated becomes too large, making it difficult for the modes to be coupled. Consequently, the differential mode delay (DMD) is increased. Therefore, in the steady section 7a, it is desirable that the core diameter be small enough to exhibit only negligible nonlinearity. Furthermore, it is desirable that the transition section 7c having a core diameter that continuously changes be provided between the steady section 7a and the increased-core-diameter section 7b. Thus, the optical loss attributed to mode nonconformity can be reduced.

The increased-core-diameter section 7b includes the plurality of cores 71b and cladding 72b surrounding the individual cores 71b. The transition section 7c includes the plurality of cores 71c and cladding 72c surrounding the individual cores 71c. The cores have different diameters between the two sections 7b and 7c but are arranged as illustrated in FIG. 2 both in the two sections 7b and 7c.

The increased-core-diameter section 7b and the transition section 7c are each obtained by, for example, heating an end portion, including the output end face, of the first transmission MCF 7 with arc discharge or with flame. The cores 71b and 71c are obtained by diffusing Ge or fluorine added to the cores 71a and the cladding 72a. In this process, it is desirable that the amount of heat be limited to a specific level or below, so that the outside diameters of the cladding 72b and the cladding 72c are made constant. Thus, the reduction in the mechanical strength can be avoided.

The second connecting MCF 3f has substantially the same configuration as the first connecting MCF 3e. Therefore, the optical loss of pump light in the multiplexer/demultiplexer 4 is reduced, and the efficiency of power utilization of the optical amplifier 2b as a whole can be increased. That is, the second connecting MCF 3f has substantially the same core arrangement (in terms of the number and interval of cores) as the amplifying MCF 1 and includes a plurality of cores (second cores) 31f and cladding (second cladding) 32f surrounding the individual cores 31f.

The second connecting MCF 3f propagates pump light at a wavelength of 980 nm or 1480 nm, which is for pumping Er and amplifying signal light, while coupling the modes thereof. In particular, compared with the signal light at a wavelength of 1530 nm to 1610 nm, the pump light at a wavelength of 980 nm is more closely confined in the cores 31f and is therefore less likely to undergo mode coupling. Hence, the degree of confinement of light in the cores 31f is lowered by making the refractive-index difference between each core 31f and the cladding 32f of the second connecting MCF 3f smaller than that of the first transmission MCF 7. Thus, even the pump light at a wavelength of 980 nm is allowed to undergo mode coupling. Such a configuration also applies to the first connecting MCF 3e.

The pump light source 5b is connected to the other end face of the second connecting MCF 3f. The pump light source 5b includes the light-emitting part 51b formed of a semiconductor laser diode that emits pump light, and the pump light output fiber 52b that transmits the pump light. The pump light output fiber 52b is a typical SMF including a single core 53b and cladding 54b.

In the second embodiment, it is desirable that the first and second connecting MCFs 3e and 3f have respective core arrangements in which one of the plurality of cores 31e and one of the plurality of cores 31f are positioned on the respective center axes. In such an arrangement, the connecting MCFs 3e and 3f are each coaxially connected to the SMF. Therefore, the pump light from the core 53b of the pump light output fiber (SMF) 52b is coupled to the one (a specific core) of the plurality of cores 31f that is positioned on the center axis of the second connecting MCF 3f. Furthermore, the pump light is coupled to the remaining cores 31f excluding the specific core 31f while being propagated through the first and second connecting MCFs 3e and 3f. In such a connection method, the coupling of the pump light from the pump light source 5b to each of the cores 11b of the amplifying MCF 1b is realized within a space as small as that realized in the known connection between SMFs. Hence, the size of the optical amplifier 2b that amplifies signal light to be transmitted through transmission channels formed of CC-MCFs can further be reduced. Moreover, in such a desirable embodiment, highly efficient coupling of pump light is realized in each of the MCFs.

In the second embodiment, light emitted from one laser diode (the light-emitting part 51b) is evenly distributed to a plurality of cores by utilizing mode coupling between connecting MCFs (the first and second connecting MCFs 3e and 3f). Furthermore, the first connecting MCF 3e is connected to the amplifying MCF 1b (the plurality of cores 31e are optically connected to the plurality of cores 11b), whereby the pump light is supplied to each of the plurality of cores 11b of the amplifying MCF 1b.

In such a configuration of supplying pump light, even if the number of cores included in each of the MCFs forming the transmission channels including the amplifying MCF 1b is increased, pump light can be efficiently supplied to each of the cores 11b of the amplifying MCF 1b without increasing the number of laser diodes (light-emitting parts 51b). Consequently, the manufacturing cost, the size, and the power consumption of the optical amplifier 2b is suppressed to be small. Suppressing the size and the power consumption of an optical amplifier is especially beneficial in submarine cable systems that are strictly restricted in terms of the size of repeaters provided on transmission channels and the supply of power to the system.

In the second embodiment, the amplifying MCF 1b and the first connecting MCF 3e are each configured as illustrated in FIG. 3 with the cores 11b and 31e extending spirally. Furthermore, the amplifying MCF 1b and the first connecting MCF 3e each propagate signal light while coupling the modes thereof. At a wavelength of 1550 nm, which is a wavelength intended for optical transmission, the amplifying MCF 1b and the first connecting MCF 3e each have an inter-core crosstalk of −17 [dB] or greater. As with the CM-CC-MCF forming the transmission channel, it is preferable that the amplifying MCF 1b and the first connecting MCF 3e each have an inter-core mode-coupling coefficient of 1[1/m] or greater, or an inter-core power-coupling coefficient of 10 [1/m] or greater. Thus, modes of signal light propagated through the cores of the optical amplifier 2b are coupled. Such mode coupling evens out the values of insertion loss that are different between the cores of the optical amplifier 2b, and the difference in insertion loss is thus reduced.

Difference in insertion loss between cores of an optical amplifier may reduce the advantageous effect of MIMO signal processing performed in the optical transmission system 100. However, in the optical amplifier 2b according to the second embodiment, since the difference in insertion loss between cores is low, the advantageous effect of MIMO signal processing can be produced satisfactorily. In the prior-art amplifying MCF that is disclosed by International Publication No. WO2011-116075 and includes a pump case, pump light is supplied from a single pump core to a plurality of amplifying cores while undergoing mode coupling. Such a configuration has a problem that signal light coupled from the amplifying cores to the pump core may result in a loss. In contrast, the optical amplifier 2b according to the second embodiment is free of such a problem.

In the optical amplifier 2b, the output end face of the amplifying MCF 1b is connected to the input port 6a of the optical filter 6. The optical filter 6 includes the input port 6a connected to the output end face of the amplifying MCF 1b, and the output port 6b connected to the input end face of the second transmission MCF 8. In the optical amplifier 2b, an end portion, including the input end face, of the second transmission MCF 8 includes a steady section 8a, an increased-core-diameter section 8b, and a transition section 8c. The steady section 8a has the same configuration (core diameter) as the second transmission MCF 8 illustrated in FIG. 4 and includes a plurality of cores 81a and cladding 82a surrounding the individual cores 81a. The increased-core-diameter section 8b includes the input end face of the second transmission MCF 8, and a plurality of cores 81b each having an increased diameter. The transition section 8c is provided between the steady section 8a and the increased-core-diameter section 8b and includes a plurality of cores 81c each having a diameter increasing from the steady section 8a to the increased-core-diameter section 8b.

The optical filter 6 includes thereinside the optical isolator 6c, the band-pass filter 6d, and other optical elements (not illustrated) such as lens. The optical isolator 6c blocks noise light, such as Rayleigh scattered light and Fresnel reflection light, propagated reversely from the increased-core-diameter section 8b toward the amplifying MCF 1b, thereby reducing the noise occurring in the optical amplifier 2b. The band-pass filter 6d blocks amplified spontaneous emission light (ASE light) and residual pump light inputted from the amplifying MCF 1b, thereby reducing the noise occurring in the optical amplifier 2b. It is preferable that the amplifying MCF 1b and the increased-core-diameter section 8b have substantially the same mode-field diameter. Thus, the insertion loss of the optical filter 6 can be reduced.

The end portion, including the input end face, of the second transmission MCF 8 includes the steady section 8a, the transition section 8c, and the increased-core-diameter section 8b. The increased-core-diameter section 8b includes the plurality of cores 81b and cladding 82b surrounding the individual cores 81b. The transition section 8c includes a plurality of cores 81c each having a continuously increasing diameter, and cladding 82c surrounding the individual cores 81c and having a constant outside diameter.

Figure 6:
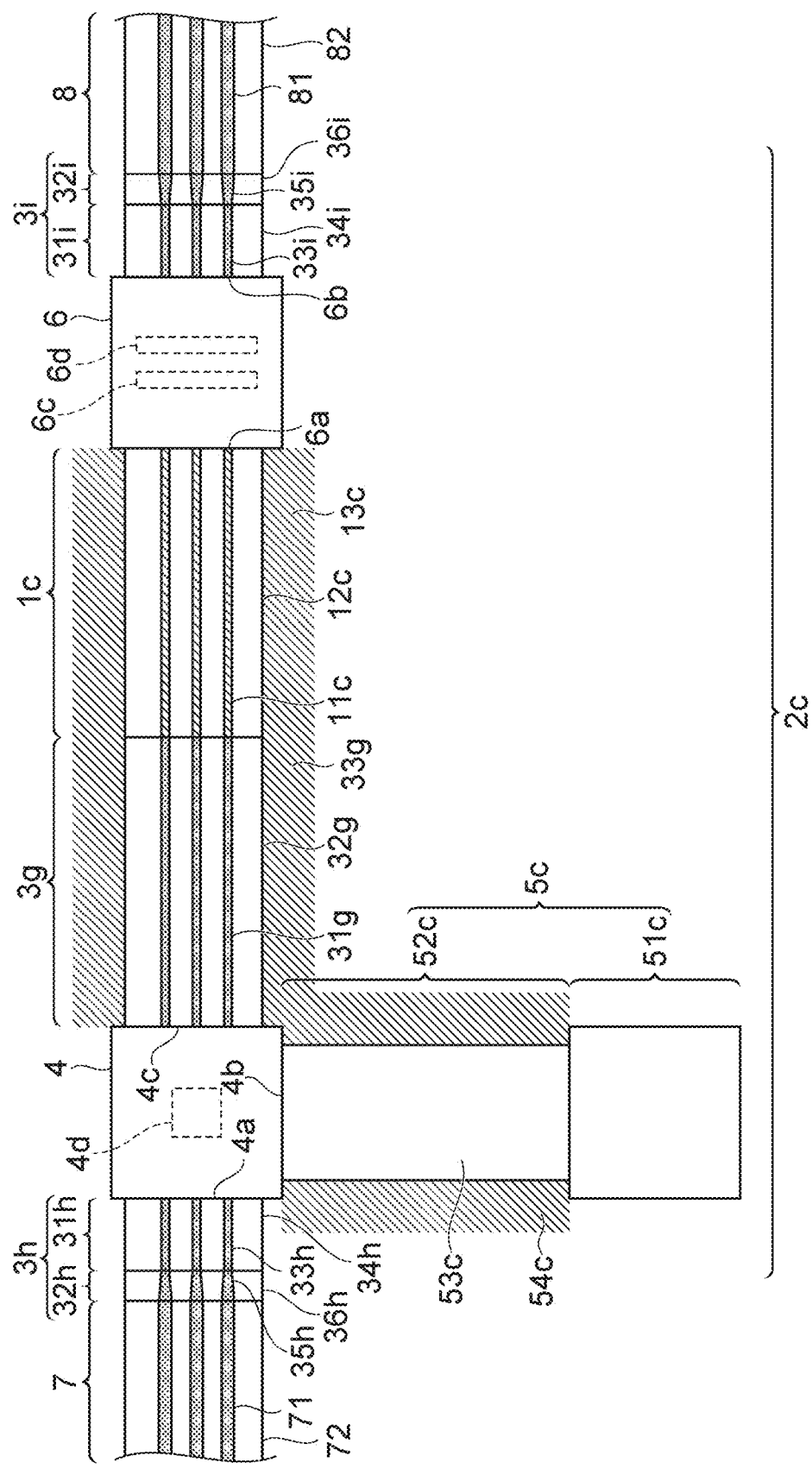
FIG. 6 is a schematic diagram of an optical amplifier according to a third embodiment.

FIG. 6 is a schematic diagram of an optical amplifier 2c according to a third embodiment. Description of features that are the same as those of the first or second embodiment is omitted accordingly. In the optical transmission system 100, the optical amplifier 2c forms part of each transmission channel extending between adjacent ones of the repeater stations. FIG. 6 illustrates only an optical configuration of the optical amplifier 2c, and the coatings (resin coatings) of the respective optical fibers are not illustrated, except some low-refractive-index coatings (resin layers 13c, 33g, and 54c) each forming part of a double-cladding structure. However, it is desirable that each of the optical fibers be appropriately coated so that the mechanical strength and the ease of removal of cladding modes are improved. The first transmission MCF 7 includes the plurality of cores 71 and the cladding 72 surrounding the individual cores 71. The second transmission MCF 8 includes the plurality of cores 81 and the cladding 82 surrounding the individual cores 81.

The optical amplifier 2c is provided between the first transmission MCF 7 and the second transmission MCF 8 and includes the multiplexer/demultiplexer 4, a pump light source 5c, a first connecting MCF 3g, an amplifying MCF 1c, and the optical filter 6. The amplifying MCF 1c includes a plurality of cores (first cores) 11c, cladding (first cladding) 12c surrounding the individual cores 11c, and the coatings and is provided between the multiplexer/demultiplexer 4 and the optical filter 6. The amplifying MCF 1c has substantially the same core arrangement (in terms of the number and interval of cores) as the amplifying MCF 1 and propagates signal light at a wavelength of 1550 nm through the cores 11c while coupling the modes thereof. The resin layer (a first resin layer) 13c is made of ultraviolet-curable resin having a lower refractive index than the cladding 12c by 1% or more in relative refractive-index difference. Hence, light coupled to the cladding 12c can also be transmitted.

The connecting MCF includes only the first connecting MCF 3g provided between the multiplexer/demultiplexer 4 and the amplifying MCF 1c. The optical amplifier 2c further includes a first MFD conversion MCF 3h provided between the multiplexer/demultiplexer 4 and the first transmission MCF 7, and a second MFD conversion MCF 3i provided between the optical filter 6 and the second transmission MCF 8. The pump light source 5c includes a light-emitting part 51c and a multi-mode optical fiber 52c. The multi-mode optical fiber 52c includes a glass core 53c, and the resin layer (a second resin layer) 54c having a lower refractive index than the glass core 53c.

The output end face of the first connecting MCF 3g is connected to the input end face of the amplifying MCF 1c. The first connecting MCF 3g has the same core arrangement as the amplifying MCF 1 and includes a plurality of cores 31g among which modes are coupled. The first connecting MCF 3g further includes cladding 32g surrounding the individual cores 31g, and the resin layer (a second resin layer) 33g surrounding the cladding (second cladding) 32g and having a lower refractive index than the cladding 32g. The cores 31g is capable of propagating signal light that has undergone mode coupling. The cladding 32g is capable of propagating pump light. The cores 31g and the cladding 32g of the first connecting MCF 3g are basically made of silica glass, with no rare-earth element such as Er added to the cores 31g.

If the first connecting MCF 3g includes cores made of pure silica glass and cladding containing fluorine as an additive, the border between each of the cores and the cladding becomes clear. Such a configuration is preferable because the alignment between the first connecting MCF 3g and the amplifying MCF 1c becomes easy. As another preferable configuration, the first connecting MCF 3g may include a plurality of cores containing Ge as an additive at the same concentration as in the amplifying MCF 1c, and cladding made of silica glass with fluorine as an additive at the same concentration as in the amplifying MCF 1c or pure silica glass. An optical fiber having such a configuration can be fusion-spliced with the amplifying MCF 1c with small loss. Furthermore, it is preferable that the first connecting MCF 3g and the amplifying MCF 1c have substantially the same core diameter. In such a case, the first connecting MCF 3g can be fusion-spliced with the amplifying MCF 1c with much smaller loss.

The input end face of the first connecting MCF 3g is connected to the output port 4c of the multiplexer/demultiplexer 4. The multiplexer/demultiplexer 4 includes the multiplexer/demultiplexer device 4d, the signal-light input port 4a to which the output end face of the first MFD conversion MCF 3h is connected, the pump-light input port 4b to which the output end face of the multi-mode optical fiber 52c forming part of the pump light source 5c is connected, and the output port 4c to which the input end face of the first connecting MCF 3g is connected. Signal light coupled to the signal-light input port 4a through the first MFD conversion MCF 3h and pump light coupled to the pump-light input port 4b through the multi-mode optical fiber 52c are multiplexed by the multiplexer/demultiplexer device 4d, and the multiplexed light is outputted from the output port 4c. The multiplexer/demultiplexer device 4d is an optical system including optical elements such as a dielectric multi-layer filter and a lens.

The first MFD conversion MCF 3h includes a steady section 31h. The steady section 31h is connected to the multiplexer/demultiplexer 4. It is desirable that the first MFD conversion MCF 3h further include a transition section 32h provided between the first transmission MCF 7 and the steady section 31h. The transition section 32h has a core diameter that continuously changes, whereby the core diameter is made to change continuously from the first transmission MCF 7 to the steady section 31h. Thus, the optical loss attributed to mode nonconformity can be reduced. The steady section 31h includes a plurality of cores 33h and cladding 34h surrounding the individual cores 33h. The transition section 32h includes a plurality of cores 35h and cladding 36h surrounding the individual cores 35h. The cores have different diameters between the two sections 31h and 32h but are arranged as illustrated in FIG. 2 both in the two sections 31h and 32h. In particular, in the steady section 31h, the first MFD conversion MCF 3h has substantially the same configuration as the first connecting MCF 3g. Therefore, the optical loss of the signal light in the multiplexer/demultiplexer 4 is reduced, and the noise generation in the optical amplifier 2c as a whole is reduced.

The transition section 32h provided between the first transmission MCF 7 and the steady section 31h of the first MFD conversion MCF 3h is obtained by, for example, heating an end of the steady section 31h with arc discharge or with flame. The cores 35h and the cladding 36h are obtained by diffusing Ge or fluorine added to the cores 33h and the cladding 34h. In this process, it is desirable that the amount of heat be limited to a specific level or below, so that the outside diameter of the cladding 36h is made constant. Thus, the reduction in the mechanical strength can be avoided.

The multi-mode optical fiber 52c includes the core 53c made of silica glass, and the resin layer 54c made of ultraviolet-curable resin having a lower refractive index than the core 53c by 1% or more in relative refractive-index difference. The other end face of the multi-mode optical fiber 52c is coupled to the light-emitting part 51c formed of a semiconductor laser diode that emits pump light.

In the third embodiment, light emitted from one laser diode (the light-emitting part 51c) is propagated to the cladding 32g of the first connecting MCF 3g and to the cladding 12c of the amplifying MCF 1c, whereby the rare-earth element contained in the plurality of cores 11c in the cladding 12c of the amplifying MCF 1c is pumped evenly. In such a configuration of supplying pump light, even if the number of cores included in each of the MCFs forming the transmission channels including the amplifying MCF 1c is increased, pump light can be efficiently supplied to each of the cores 11c of the amplifying MCF 1c without increasing the number of laser diodes (light-emitting parts 51c). Consequently, the manufacturing cost, the size, and the power consumption of the optical amplifier 2c is suppressed to be small. Suppressing the size and the power consumption of an optical amplifier is especially beneficial in submarine cable systems that are strictly restricted in terms of the size of repeaters provided on transmission channels and the supply of power to the system.

In the third embodiment, a spatial multi-mode laser can be employed as the pump light source 5c that couples pump light to the second cladding. The spatial multi-mode laser has a lower spatial power density than a spatial single-mode laser. Therefore, the spatial multi-mode laser can emit pump light of greater output power. Thus, the output power of the optical amplifier 2c can be increased.

In the third embodiment, the amplifying MCF 1c and the first connecting MCF 3g are configured as illustrated in FIG. 3 with the cores 11c and 31g extending spirally, and propagate signal light while coupling the modes thereof. At a wavelength of 1550 nm, which is a wavelength intended for optical transmission, the amplifying MCF 1c and the first connecting MCF 3g each have an inter-core crosstalk of −17 [dB] or greater. As with the CM-CC-MCF forming the transmission channel, it is preferable that the amplifying MCF 1c and the first connecting MCF 3g each have an inter-core mode-coupling coefficient of 1 [1/m] or greater, or an inter-core power-coupling coefficient of 10 [1/m] or greater. Thus, modes of signal light propagated through the cores of the optical amplifier 2c are coupled. Such mode coupling evens out the values of insertion loss that are different between the cores of the optical amplifier 2c, and the difference in insertion loss is thus reduced. In addition, it is preferable that the first connecting MCF 3g have an inter-core crosstalk of −17 [dB] or greater at the pump wavelength.

Difference in insertion loss between cores of an optical amplifier may reduce the advantageous effect of MIMO signal processing performed in the optical transmission system 100. However, in the optical amplifier 2c according to the third embodiment, since the difference in insertion loss between cores is low, the advantageous effect of MIMO signal processing can be produced satisfactorily. In the prior-art amplifying MCF that is disclosed by International Publication No. WO2011-116075 and includes a pump core, pump light is supplied from a single pump core to a plurality of amplifying cores while undergoing mode coupling. Such a configuration has a problem that signal light coupled from the amplifying cores to the pump core may result in a loss. In contrast, the optical amplifier 2c according to the third embodiment is free of such a problem.

In the optical amplifier 2c, the output end face of the amplifying MCF 1c is connected to the input port 6a of the optical filter 6. The optical filter 6 includes the input port 6a connected to the output end face of the amplifying MCF 1c, and the output port 6b connected to the input end face of the second MFD conversion MCF 3i. Furthermore, the optical filter 6 includes thereinside the optical isolator 6c, the band-pass filter 6d, and other optical elements (not illustrated) such as lens. The optical isolator 6c blocks noise light, such as Rayleigh scattered light and Fresnel reflection light, propagated reversely from the second MFD conversion MCF 3i toward the amplifying MCF 1c, thereby reducing the noise occurring in the optical amplifier 2c. The band-pass filter 6d blocks amplified spontaneous emission light (ASE light) and residual pump light inputted from the amplifying MCF 1c, thereby reducing the noise occurring in the optical amplifier 2c.

The second MFD conversion MCF 3i is connected to the second transmission MCF 8. The second MFD conversion MCF 3i and the second transmission MCF 8 have substantially the same core arrangement (in terms of the number and interval of cores) as the amplifying MCF 1. Furthermore, as with the first MFD conversion MCF 3h, the second MFD conversion MCF 3i includes a steady section 31i. The steady section 31i is connected to the output port 6b of the optical filter 6. It is desirable that the second MFD conversion MCF 3i further include a transition section 32i provided between the second transmission MCF 8 and the steady section 31i. The transition section 32i has a core diameter that continuously changes, whereby the core diameter is made to change continuously from the second transmission MCF 8 to the steady section 31i. Thus, the optical loss attributed to mode nonconformity can be reduced. The steady section 31i includes a plurality of cores 33i and cladding 34i surrounding the individual cores 33i. The transition section 32i includes a plurality of cores 35i and cladding 36i surrounding the individual cores 35i.

Figure 7:
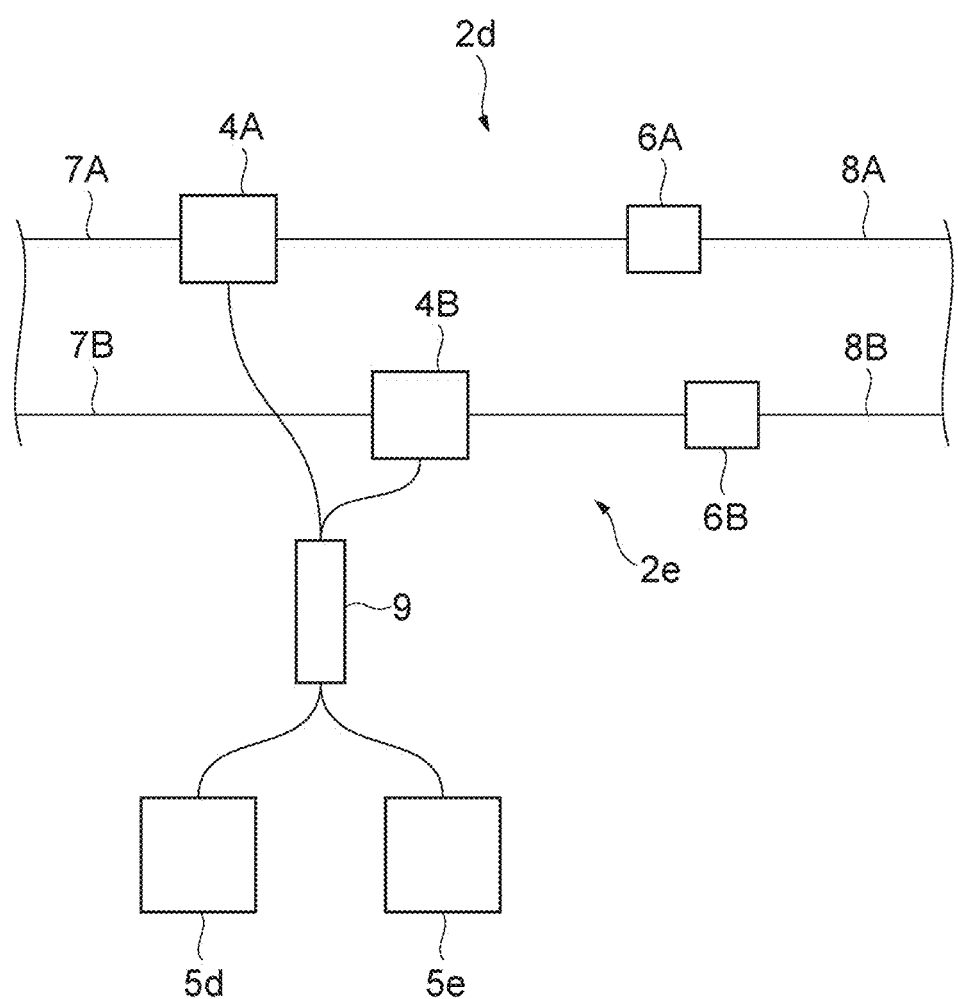
FIG. 7 is a schematic diagram of an optical amplifier according to a fourth embodiment.

FIG. 7 is a schematic diagram of an optical amplifier according to a fourth embodiment. The optical amplifier according to the fourth embodiment is applicable to a case where the transmission channels between the repeater stations of the optical transmission system 100 each include two lines. The optical amplifier includes two optical amplifiers 2d and 2e that are pumped by two respective pump light sources 5d and 5e. In such a configuration, signal light is propagated and amplified in each of the two lines of the transmission channel (the transmission line extending from a first transmission MCF 7A to a second transmission MCF 8A, and the transmission line extending from a first transmission MCF 7B to a second transmission MCF 8B). Specifically, signal light that is amplified by the optical amplifier 2d of the two amplifying lines is fed from an optical filter 6A to the second transmission MCF 8A, and signal light that is amplified by the optical amplifier 2e is fed from an optical filter 6B to the second transmission MCF 8B. Furthermore, pump light outputted from the pump light source 5d and pump light outputted from the pump light source 5e are multiplexed by an optical coupler 9 and is then coupled to two respective multiplexer/demultiplexers 4A and 4B.

The two first transmission MCFs 7A and 7B each correspond to the first transmission MCF 7 illustrated in any of FIGS. 4 to 6. The two second transmission MCFs 8A and 8B each correspond to the second transmission MCF 8 illustrated in any of FIGS. 4 to 6. The two multiplexer/demultiplexers 4A and 4B each correspond to the multiplexer/demultiplexer 4 illustrated in any of FIGS. 4 to 6. The two optical filters 6A and 6B each correspond to the optical filter 6 illustrated in any of FIGS. 4 to 6. The pump light sources 5d and 5e each correspond to any of the pump light sources 5a to 5c illustrated in FIGS. 4 to 6. The optical amplifiers 2d and 2e each correspond to any of the optical amplifiers 2a to 2c illustrated in FIGS. 4 to 6.

In the optical amplifier according to the fourth embodiment, even if one of the pump light sources 5d and Se has a failure, pump light is supplied from the other one. Therefore, complete malfunction of either of the optical amplifiers 2d and 2e can be avoided. Hence, according to the fourth embodiment, the optical amplifier as a whole is prevented from stalling, with a smaller number of components. Therefore, higher reliability can be provided with a smaller volume (a smaller capacity for setting the optical amplifier). Such a structural feature is important particularly in submarine cable systems.

What is claimed is:

1. An optical amplifier comprising:
   an amplifying multi-core optical fiber including a plurality of first cores each extending along a first center axis and made of silica glass with a rare-earth element added to the silica glass, and first cladding surrounding the individual first cores and made of silica glass having a lower refractive index than all of the first cores, the amplifying multi-core optical fiber having an absorption coefficient of 1 dB/m or greater at a pump wavelength at which the rare-earth element is pumped, and a length such that an inter-core crosstalk of the amplifying multi-core optical fiber is 17 dB or greater at an amplifying wavelength at which the rare-earth element amplifies light;
   a connecting multi-core optical fiber including a plurality of second cores each extending along a second center axis and optically connected to a corresponding one of the plurality of first cores, the second cores being made of silica glass, and second cladding surrounding the individual second cores and made of silica glass having a lower refractive index than all of the second cores; and
   a pump light source that supplies pump light at the pump wavelength to the rare-earth element in the plurality of first cores through the connecting multi-core optical fiber,
   wherein each of the first cores has a diameter of 2 μm to 16 μm, and
   an interval between centers of adjacent ones of the first cores is 30 μm or smaller.

2. The optical amplifier according to claim 1,
   wherein the connecting multi-core optical fiber has a length such that an inter-core crosstalk of the connecting multi-core optical fiber is 17 dB or greater at the pump wavelength, and
   wherein the pump light supplied from the pump light source pumps the rare-earth element after the pump light is coupled to at least one of the plurality of second cores, is further coupled to remaining ones of the plurality of second cores, and is further coupled from each of the plurality of second cores to a corresponding one of the plurality of first cores that is optically connected to that second core.

3. The optical amplifier according to claim 1,
   wherein, in a section of the amplifying multi-core optical fiber that is taken orthogonally to the first center axis, one of the plurality of first cores is positioned on the first center axis,
   wherein, in a section of the connecting multi-core optical fiber that is taken orthogonally to the second center axis, one of the plurality of second cores is positioned on the second center axis,
   wherein the pump light source includes a single-core single-mode optical fiber including a third core containing and extending along a third center axis, and third cladding surrounding the third core, and
   wherein the single-core single-mode optical fiber and the connecting multi-core optical fiber are arranged such that the third core and the second core that is positioned on the second center axis are optically connected to each other, and the pump light is coupled to the remaining cores excluding the second core while being propagated through the connecting multi-core optical fiber.

4. The optical amplifier according to claim 2,
   wherein, in a section of the amplifying multi-core optical fiber that is taken orthogonally to the first center axis, one of the plurality of first cores is positioned on the first center axis,
   wherein, in a section of the connecting multi-core optical fiber that is taken orthogonally to the second center axis, one of the plurality of second cores is positioned on the second center axis,
   wherein the pump light source includes a single-core single-mode optical fiber including a third core containing and extending along a third center axis, and third cladding surrounding the third core, and
   wherein the single-core single-mode optical fiber and the connecting multi-core optical fiber are arranged such that the third core and the second core that is positioned on the second center axis are optically connected to each other, and the pump light is coupled to the remaining cores excluding the second core while being propagated through the connecting multi-core optical fiber.

5. The optical amplifier according to any of claim 1,
   wherein the amplifying multi-core optical fiber further includes a first resin layer surrounding the first cladding and having a lower refractive index than the first cladding,
   wherein the connecting multi-core optical fiber further includes a second resin layer surrounding the second cladding and having a lower refractive index than the second cladding, the second cladding being optically connected to the first cladding, and wherein the pump light that is supplied from the pump light source is coupled to the second cladding, is further coupled from the second cladding to the first cladding, and pumps the rare-earth element in the plurality of first cores surrounded by the first cladding.

6. The optical amplifier according to claim 1,
wherein the rare-earth element includes erbium, and
wherein the pump wavelength is 980 nm, and the amplifying wavelength is 1550 nm.

7. A multi-core optical fiber comprising:
a plurality of cores each extending along a predetermined center axis and made of silica glass with a rare-earth element added to the silica glass;
cladding surrounding the individual cores and made of silica glass having a lower refractive index than all of the plurality of cores; and
a resin coating surrounding an outer peripheral surface of the cladding,
wherein the multi-core optical fiber has a length such that an inter-core crosstalk as an index representing a state of coupling between adjacent ones of the plurality of cores is −17 dB or greater at a wavelength of 1550 nm,
each of the cores has a diameter of 2 μm to 16 μm, and
an interval between centers of adjacent ones of the plurality of cores is 30 μm or smaller.

8. The multi-core optical fiber according to claim 7,
wherein the plurality of cores include one core extending spirally around and along the center axis.

\* \* \* \* \*